United States Patent [19]
Wallace

[11] 4,428,981
[45] Jan. 31, 1984

[54] METHOD AND APPARATUS FOR MAKING FRICTION LOCKING THREADED FASTENERS

[75] Inventor: Richard B. Wallace, Bloomfield Hills, Mich.

[73] Assignee: The Oakland Corporation, Troy, Mich.

[21] Appl. No.: 376,764

[22] Filed: May 10, 1982

[51] Int. Cl.³ .............................................. B05D 1/02
[52] U.S. Cl. .................................. 427/195; 427/425; 411/1; 411/301; 411/258; 411/903; 10/10 P; 118/308; 118/310; 118/316; 118/322
[58] Field of Search .................. 411/1, 301, 258, 903; 10/10 P; 118/66, 308, 310, 316, 322; 427/195, 425

[56] References Cited

U.S. PATENT DOCUMENTS

| | | | |
|---|---|---|---|
| 3,452,714 | 7/1969 | Burke et al. | 118/308 X |
| 3,579,684 | 5/1971 | Duffy | 427/195 |
| 3,677,801 | 7/1972 | Hardy | 118/233 X |
| 4,223,632 | 9/1980 | Cadwallader | 427/195 X |
| 4,285,378 | 8/1981 | Wallace | 427/195 X |

*Primary Examiner*—Shrive P. Beck
*Attorney, Agent, or Firm*—Barnes, Kisselle, Raisch, Choate, Whittemore & Hulbert

[57] ABSTRACT

The improved method of making externally threaded friction fasteners which comprises directing a stream of particles of thermoplastic friction material onto the threaded surface of the fastener which has been heated to a temperature sufficient to fuse the thermoplastic particles so as to provide a deposit of substantial thickness in the thread grooves of the fastener extending completely around the fastener, in which the fasteners are advanced past a station at which the thermoplastic particles are directed at one or both sides of the threaded portion, and which comprises spinning the fasteners during application of the particles at a rate sufficient to cause the deposit of particles to extend completely around each fastener, and preferably to comprise at least two sequentially applied applications.

7 Claims, 5 Drawing Figures

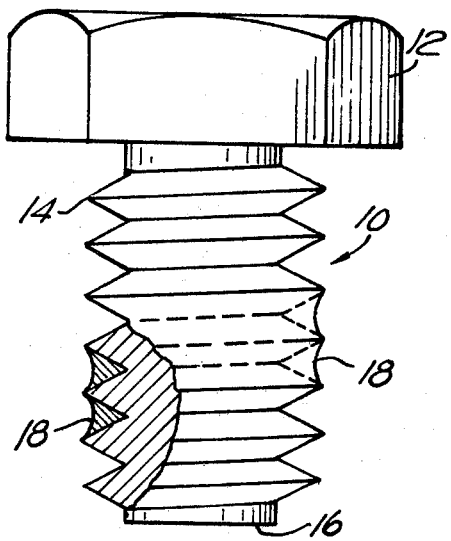
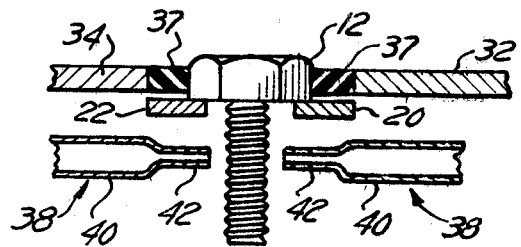
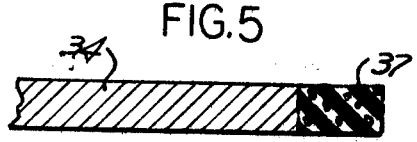
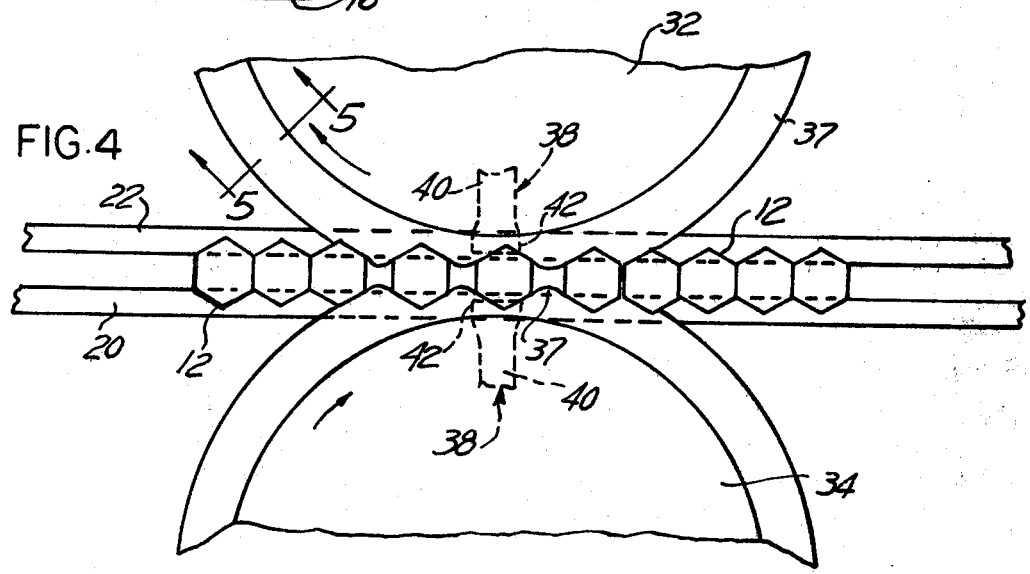
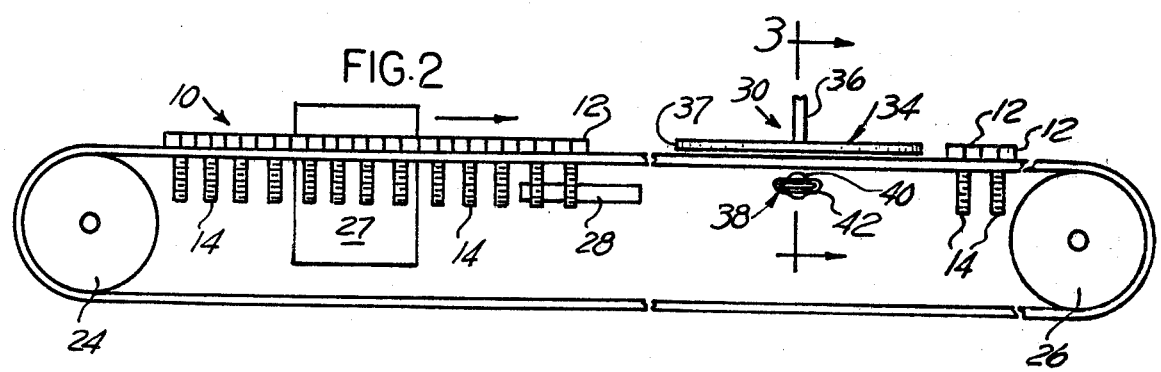

METHOD AND APPARATUS FOR MAKING FRICTION LOCKING THREADED FASTENERS

STATE OF THE ART

Among several different commercially practiced methods of producing externally threaded locking fasteners, it is known to advance a series of threaded fasteners such as bolts by means of laterally spaced belts engaging under the heads of the bolts. As the fasteners advance they traverse a heating zone at which at least the threaded portion of the fasteners are heated to a temperature sufficient to fuse particles of a selected thermoplastic friction material. A common material for this purpose is nylon 6 or 11 which has a fusion temperature of approximately 400° F. Thereafter the series of fasteners is advanced through a particle deposit zone at which a stream of particles of thermoplastic material is directed against at least one side of the threaded portions of the fasteners.

The particles of thermoplastic material adhere to the heated thread surface and are fused into a continuous solid deposit which in turn is fused to the thread surfaces. This deposit is for the most part in the thread grooves and the dimension of the zone of application of the particles, the rate of advance of the fasteners, and the rate of rotation, if any, of the fasteners are correlated such that the deposit of friction material has a radial dimension measuring from the bottom of the thread grooves which is at least substantially one-half of the height of the threads as measured from the roots to the crests thereof.

BRIEF SUMMARY OF THE INVENTION

In accordance with the present invention the previously known method is modified primarily by spinning the fasteners at a substantial speed as they traverse the particle deposit zone.

The particles may be applied from one side of the line of advancing fasteners, or the streams of particles may be directed from opposite sides.

The stream of thermoplastic particles isconveniently formed by an air flow through a tubular supply conduit, one end of which is flattened to form an elongated discharge nozzle at the end of the tube. This nozzle projects the stream of air borne particles in a thin fan-shaped form. Where the elongation of the slot is parallel to the direction of advance of the fasteners it defines an elongated zone of deposition which is of limited vertical dimension. The nozzle may be angularly adjusted about the horizontal axis of the tube, and control the horizontal dimension of the zone in the direction of advance of the fasteners, as well as its vertical dimension, which controls the dimension of the deposit of particles axially of the fastener, or the width of the ring of friction material.

It will be appreciated that the deposit of particles may also be controlled by varying the speed of spin or rotation of the fasteners, by varying the rate of advance of the fasteners through the application zones, and by controlling the shape and dimension of the spray which the nozzle emits.

One of the difficulties which has been troublesome in the method as practiced in the past is the relatively high temperature necessary to fuse the particles at the outer surface of the deposit, since the heat for this purpose is required to traverse the thickness of the deposit. During application of the particles, the source of the heat necessary to fuse the particles is of course limited to the previously heated thread surfaces. As a result of this it was necessary to heat the fastening elements, or the threaded portions thereof, to a temperature substantially above the fusion temperature of the thermoplastic material. Where the thermoplastic material is nylon having a fusion temperature of approximately 400° F., it was often necessary to heat the fastener to a temperature of as high as 650° F. to ensure that the particles at the surface of the deposit are properly fused together. This temperature besides being wasteful of energy damages certain metallic coatings commonly provided on threaded members, such for example as zinc coatings, as well as the resin.

In the present invention the deposit of thermoplastic particles is built up in sequentially applied applications. Accordingly each application of particles is fused or at least substantially fused prior to the succeeding application. While the variables above referred to may be controlled to produce a multiplicity of sequentially applied deposits, the advantages of the present invention are realized when the length of the application zone, the rate of advance, and the rate of spin are correlated such as to produce a deposit extending completely around the fastener. It is contemplated that as many as ten applications may be provided.

A feature of the present invention is the preliminary heating of the fasteners as for example in economic gas-fired furnaces. The fasteners may be brought to a temperature of 200–300° F. which reduces the energy required to raise the threaded surfaces to the required fusion temperature. Final heating may conveniently be accomplished by flameless heating, such for example as by induction heating.

While the use of gas-fired heaters alone is not to be excluded, it is preferable to avoid flame producing heaters immediately adjacent the particle application zone, to avoid the possibility of igniting the powder spray.

Significant advantages of forming the deposits of friction material in a continuous ring or band extending completely around the fastener are realized. In the first place, the deposit need have only approximately one half the radial dimension or depth of a localized patch at one side of the fastener. This is because the localized patch must take up the sum of the radial clearance existing at both sides of the fastener, with respect to a mating threaded member. The ring patch, acting at all diametrically related zones, is required to take up only the radial clearance existing at one side between concentric mating threaded fasteners. Secondly, the ring patch is most efficient to provide a seal between the mated threaded fasteners. Finally, the frictional resistance to turning is effective throughout the complete 360° zone.

The apparatus for carrying out the method as described in the foregoing comprises essentially the provision of a pair of relatively large diameter wheels having soft compressible tires or rims engageable with the heads of the fasteners as they advance into the particle application zone. These wheels are driven in opposite directions so as to produce relatively rapid rotation or spinning of the fasteners on their own axes as they traverse the application zone. The rate of advance of the individual fasteners through the zone is controlled by selecting differential rates of rotation of the wheels.

It is noted that the fasteners may normally be advanced by the flexible belts with hexagonal heads of the fasteners in abutment. The differential rates of rotation of the wheels is selected such that the fasteners advance through the application zone at a rate somewhat greater than the rate at which they are advanced by the belts. This separates the heads of the bolts for non-interfering rotation as they traverse the particle application zone.

The wheels are positioned above the belts in position to engage the sides of the heads of the fasteners, which remain supported vertically by the flexible belts.

BRIEF DESCRIPTION OF THE DRAWINGS

FIG. 1 is an elevational view of a fastener produced by the present method.

FIG. 2 is a diagrammatic elevational view of the apparatus.

FIG. 3 is a fragmentary enlarged sectional view on the line 3—3, FIG. 2.

FIG. 4 is an enlarged plan view of the apparatus at the application shown.

FIG. 5 is an enlarged sectional view on the line 5—5, FIG. 4.

DETAILED DESCRIPTION

The present invention is concerned with the production of externally threaded fasteners provided with friction material effective to retain the threaded fasteners in engagement with mating fastening parts. As illustrated in FIG. 1 an example of such a fastener is a bolt 10 having a hexagonal head 12 and a threaded shank 14. At an annular zone spaced both from the head 12 and the end 16 of the bolt there is a deposit 18 of friction material which as seen in FIG. 1 may substantially fill the thread spaces of the threaded shank. This material as will subsequently be described, is applied by directing a stream of particles of thermoplastic friction material such as nylon against the heated threaded surfaces of the fastener while the fastener is rotated to cause the deposit of particles to be built up in a successive series of applications. While the friction material is applied in the form of a powder or relatively fine particles, the temperature of the thread surfaces onto which the thermoplastic material is directed is sufficient to produce fusion of the particles. This not only provides a fused bond between the deposit and the thread surfaces but it also causes the deposit to become in effect a solid continuous body in the thread groove. In practice the final deposit presents an outwardly concave surface in a direction traverse to the thread groove, and the depth of the deposit is such that its radial dimension measured from the bottom of the thread groove is at least half the thread height as measured from the root to the crest of the thread.

The amount of friction material may vary, but as seen in FIG. 1, it fills the bottom of the thread grooves, and the fused bond with the side surfaces of the adjacent threads extends substantially to the crests of the threads. The deposit is of course dimensioned to interfere with the threads of a mating member, so as to establish frictional resistance to turning between the fastener to which the frictional material is bonded, and the mating member.

A high production method of producing threaded friction fasteners 10 is illustrated in FIGS. 2-5.

Referring to these figures the threaded fasteners are advanced with the threaded shanks 14 extending vertically downwardly and the heads 12 supported on flexible belts 20 and 22. Belts 20 and 22 may conveniently be formed of metal and are advanced by rollers 24 and 26. Intermediate lengths of the belts 20 and 22 may be supported by suitable means not shown so that the series of bolts 10 are advanced horizontally as for example to the right as seen in FIG. 2.

As previously noted, the fasteners 10 may advantageously be heated to elevated temperatures somewhat less than required to produce fusion of the subsequently applied particles of thermoplastic material before final heating. This may be accomplished by passing the fasteners through a gas-fired preliminary heater 27. As the fasteners 10 are further advanced by the belts 20 and 22 they traverse a final heating station indicated diagrammatically at 28 which may conveniently be induction heating apparatus. The heaters are capable of accurate control so as to raise the temperature of the threaded shanks of the fasteners to the minimum temperature required to produce fusion throughout of the deposit of particles of thermoplastic material. The preliminary heating of the fasteners in economic gas-fired furnaces substantially reduces the load on the induction heater.

It will be understood that the induction heaters may be located at one or both sides of the line of advancing fasteners as required.

Immediately after the fasteners are brought to the required miminum temperature for producing uniform fusion of the thermoplastic particles into a continuous condition, the belts advance the heated fasteners to the particle application zone indicated generally at 30 in FIG. 2. In this zone, as more clearly seen in FIG. 4, there are provided two oppositely rotating wheels 32 and 34 positioned by rotating spindles 36 extending vertically and supporting the wheels for rotation in a horizontal plane and engageable at their peripheries with the heads 12 of the fasteners 10.

The wheels 32 and 34, as best illustrated in FIG. 5 are provided with soft compressible rims or tires 37 which are engageable with the hexagonal heads of a plurality of fasteners for a substantial distance along the line of advance. Since the wheels are rotated so that the portions engaging the heads of the bolts are moving in opposite directions as indicated by the arrows they rotate or spin the fasteners about the axes by rates determined by the speed of rotation of the wheels.

In addition the speed of rotation of the wheel 34, whose bolt contracting edge moves in the direction of advance of the fasteners to the right in FIG. 4 exceeds the speed of rotation of the wheel 32 so that while engaged between the opposing wheels 32, 34, the fasteners are advanced through the particle application zone 30 at a speed slightly in excess of the speed of advance of the belts 20, 22. Accordingly, while the hexagonal heads of the bolts may be in abutment as they enter the application zone, they are separated during the traverse of the zone sufficient to permit independent rotation of the hexagonal heads without interference.

At the application zone 30 nozzles 38 are provided at one or both sides of the line of advance of the fasteners. Conveniently the nozzles 38 may comprise tubular portions 40 having flattened ends 42 which provide elongated ports through which the thermoplastic particles are directed in a generally diverging fan-shaped spray against the sides of the fasteners.

As previously stated, the longitudinal dimension of the application zone as determined by the configuration and angular position of the nozzles 38, and the speeds of rotation of the wheels 32 and 34 are selected such that the deposit 16 of fluid material is built up in successive applications of powdered material so that successive applications of powdered material are onto previously fused portions of the deposit.

With this arrangement it is found that satisfactory fused deposits may be produced on threaded fasteners whose initial temperature at the beginning of application of the particles is substantially below what was previously found to be required where the deposits were essentially the result of a single application of particles of thermoplastic material.

As described above it is found that the benefits of the improved method of deposition in accordance with the present invention require that the entire depositions extend completely around the threaded shank, and preferably comprise at least two successive applications of the particles of thermoplastic material.

In a specific example of the present invention, the deposition was made intermediate the ends of the threaded portion of bolts having a thread diameter of 0.250 inches. The particles of thermoplastic material were supplied by opposed nozzles at opposite sides of the line of advance of the fasteners having a dimension longitudinal of the line of advance of approximately one-half inch. The rate of advance of the fasteners through the application zone was ten feet per minute, which causes the individual fasteners to traverse the application zone in 0.50 seconds. The rate of rotation of spin of the individual fasteners as they traverse the application zone was 90 rpm. This results in 1.5 revolutions of the fasteners as they traverse the application zone, and with two opposed nozzles, produces a total deposition built up by approximately three successive applications of the thermoplastic particles.

I claim:

1. The method of treating headed, externally threaded fasteners to provide deposits of thermoplastic friction material extending completely around the fasteners in annular friction zones intermediate the ends of the threaded portions, located primarily in the thread grooves thereof, in which the deposits extend from the bottoms of the thread grooves substantially to the crests of the adjacent threads, which comprises advancing a series of fasteners horizontally suspended by the heads of the fasteners between laterally spaced flexible belts with the threaded shanks of the fasteners extending vertically below the belts, advancing the fasteners through a heating zone in which the threaded shanks are heated to above the fusion temperature of the thermoplastic material, advancing the fasteners between a pair of rotating wheels having yieldable peripheries and occupying the plane of the heads of the fasteners to impart a spin to the fasteners as they traverse a particle application zone, and directing a stream of thermoplastic particles against the sides of the shanks of the fasteners as they traverse the application zone, and relating the rate of advance of the fasteners through the application zone and the rate of spin to the dimension of the application zone in the direction of advance of the fasteners so as to cause the deposit of particles to extend completely around the fasteners to form annular friction zones.

2. The method as defined in claim 1, in which the rate of spin and advance of the fasteners is such as to cause the deposition of particles to comprise at least two sequentially applied deposits.

3. The method as defined in claim 2, which comprises advancing the fasteners to the particle application zone with the heads of successive fasteners in abutment, and rotating the wheels at respectively different speeds so as to advance the fasteners through the application zone at a speed slightly greater than the speed of advance of the fasteners by the belts to cause sufficient separation between the heads of adjacent fasteners to permit independent rotation thereof without interference.

4. Apparatus for applying particles of thermoplastic material to the threaded portions of a series of headed, externally threaded fasteners having the threaded shanks thereof heated to a temperature above the fusion temperature of the thermoplastic material, which comprises a pair of laterally spaced belts which engage under the heads of the fasteners and suspend the fasteners with the threaded shanks downwardly below said belts, a particle application zone comprising a nozzle for directing a stream of particles against the sides of the shanks, and a pair of wheels having yieldable peripheral portions and rotatable at opposite sides of the line of advance of the fasteners, said wheels being engageable with the heads of said fasteners throughout passage of the fasteners through the application zone, and means for rotating said wheels at different speeds selected to spin the fasteners about their own axes and to advance the spinning fasteners through the application zone.

5. Apparatus as defined in claim 4, in which the belts suspend the fasteners as they advance to and beyond the application zone but do not interfere with rotation thereof by the rotating wheels in the application zone.

6. Apparatus as defined in claim 4, which comprises like nozzles at opposite sides of the line of advancing fasteners.

7. Apparatus as defined in claim 4, in which the nozzle has an elongated narrow exit slot, said nozzle being rotatable to incline the nozzle to control the vertical and horizontal dimension of the application zone relative to the fasteners.

* * * * *